(12) United States Patent
Weldon-Ming

(10) Patent No.: US 11,877,586 B2
(45) Date of Patent: Jan. 23, 2024

(54) FOOD DEHYDRATOR

(71) Applicant: Richard Weldon-Ming, Randburg (ZA)

(72) Inventor: Richard Weldon-Ming, Randburg (ZA)

(*) Notice: Subject to any disclaimer, the term of this patent is extended or adjusted under 35 U.S.C. 154(b) by 869 days.

(21) Appl. No.: 16/960,394

(22) PCT Filed: Jan. 7, 2019

(86) PCT No.: PCT/ZA2019/050001
§ 371 (c)(1),
(2) Date: Jul. 7, 2020

(87) PCT Pub. No.: WO2019/136498
PCT Pub. Date: Jul. 11, 2019

(65) Prior Publication Data
US 2020/0404952 A1    Dec. 31, 2020

(30) Foreign Application Priority Data
Jan. 7, 2018  (ZA) .................................. 2017/05860

(51) Int. Cl.
A23L 3/54        (2006.01)
A23B 4/03       (2006.01)
F26B 3/04       (2006.01)

(52) U.S. Cl.
CPC ............... *A23L 3/54* (2013.01); *A23B 4/031* (2013.01); *F26B 3/04* (2013.01); *A23V 2002/00* (2013.01)

(58) Field of Classification Search
CPC ... A23L 3/40; A23L 3/54; A23B 4/031; F26B 3/04; F26B 21/02; F26B 25/18; F26B 9/00; F26B 9/066; F26B 9/003; A23V 2002/00
USPC .................... 99/476, 483, 516; 219/386, 400
See application file for complete search history.

(56) References Cited

U.S. PATENT DOCUMENTS

| 4,236,063 | A | | 11/1980 | Glucksman |
| 4,380,127 | A | * | 4/1983 | Roberts ..................... A23L 3/40 |
| | | | | 34/237 |
| 5,379,527 | A | | 1/1995 | Su |
| 5,423,249 | A | * | 6/1995 | Meyer ....................... A23L 3/40 |
| | | | | 219/400 |
| 2013/0326902 | A1 | | 12/2013 | Barrows |

FOREIGN PATENT DOCUMENTS

| FR | 880989 | 4/1943 | |
| JP | 5674583 | 6/1981 | |
| JP | 20004000724 A | 1/2004 | |
| JP | 5674582 B2 | 2/2015 | |
| KR | 100509521 | 8/2005 | |
| WO | 9830851 A1 | 7/1998 | |
| WO | WO-9830851 A1 * | 7/1998 | .............. A01J 11/04 |

OTHER PUBLICATIONS

International Search Report in related PCT Application No. PCT/ZA2019/050001, dated May 8, 2019.
Written Opinion in related PCT Application No. PCT/ZA2019/050001, dated May 8, 2019.

* cited by examiner

*Primary Examiner* — Phuong T Nguyen
(74) *Attorney, Agent, or Firm* — Bacon & Thomas, PLLC

(57) ABSTRACT

A food dehydrator with a heating element located beneath a fan in a chamber of the food dehydrator. The heating element includes resistors, connected in series, sandwiched between and in thermal contact with two heatsinks to heat and dry the air within a volume defined by the chamber.

8 Claims, 3 Drawing Sheets

FOOD DEHYDRATOR

BACKGROUND OF THE INVENTION

This invention relates to a food dehydrator used to dry foodstuffs.

A conventional food dehydrator includes a chamber in which an incandescent lamp is mounted to heat the chamber. Foodstuffs are placed in the chamber to be dried with the heat generated by the lamp. The lamp is usually located in a base of the chamber and an extractor is mounted in a roof to extract moisture from the chamber.

The heating of the chamber is an essential part of the dehydrating function of the food dehydrator.

In first world countries there has been a movement towards conservation. This includes, amongst other initiatives, the implementation of laws that render the use of high-energy consuming light sources, such as incandescent light bulbs, illegal.

Food dehydration is a convenient method of preserving food for many types of food can be used or consumed in a dried form.

There is thus a need for a mechanism to allow a food dehydrator to perform its dehydration function, without the use of A high energy-consuming heating element, such as AN incandescent lamp.

It is an aim of the current invention to address, at least partly, the aforementioned problem.

SUMMARY OF INVENTION

The invention provides a food dehydrator which has a chamber defining a volume for receiving foodstuff, and a heating element located in the chamber, the heating element comprising at least a first heatsink which is in thermal contact with at least one resistor which is connected in series with a switch supplied with current from an external power source.

The switch may be a thermal cut-out switch.

The resistor may be contacted to the heatsink by means of a thermal paste, such as silicone, to maintain a positive heatsink bond.

A protective plate, which may act as a second heatsink, may be placed over the resistor to prevent rapid cooling of the resistor due to air blowing onto the resistor.

At least the first heatsink may be made from aluminium. The protective plate, however, could be made from a material which does not conduct heat—the invention is not limited in this respect.

A fan, powered by the external power source, may be mounted in the chamber to create an airflow in the chamber. Preferably, the fan is connected in parallel to the switch.

The fan and the heating element may be positioned within the chamber so that air flows over the resistor and the first heatsink thereby to distribute heated and dried air in the volume.

The fan may be located in or on a lid of the chamber.

The resistor may be sandwiched between the first and second heatsink or cover and be mounted below the fan.

Suitable spacers may be used to space the heating element from the fan to ensure effective distribution of heated air.

Each heatsink may be shaped to restrict access to the resistor and associated current carrying wires.

A power supply box may be mounted to an external part of the chamber and may be connectable to supply power to the resistor, and the fan, from the power source.

BRIEF DESCRIPTION OF THE DRAWINGS

The invention is further described by way of example with reference to the accompanying drawings wherein.

DETAILED DESCRIPTION OF THE INVENTION

Figure 1:
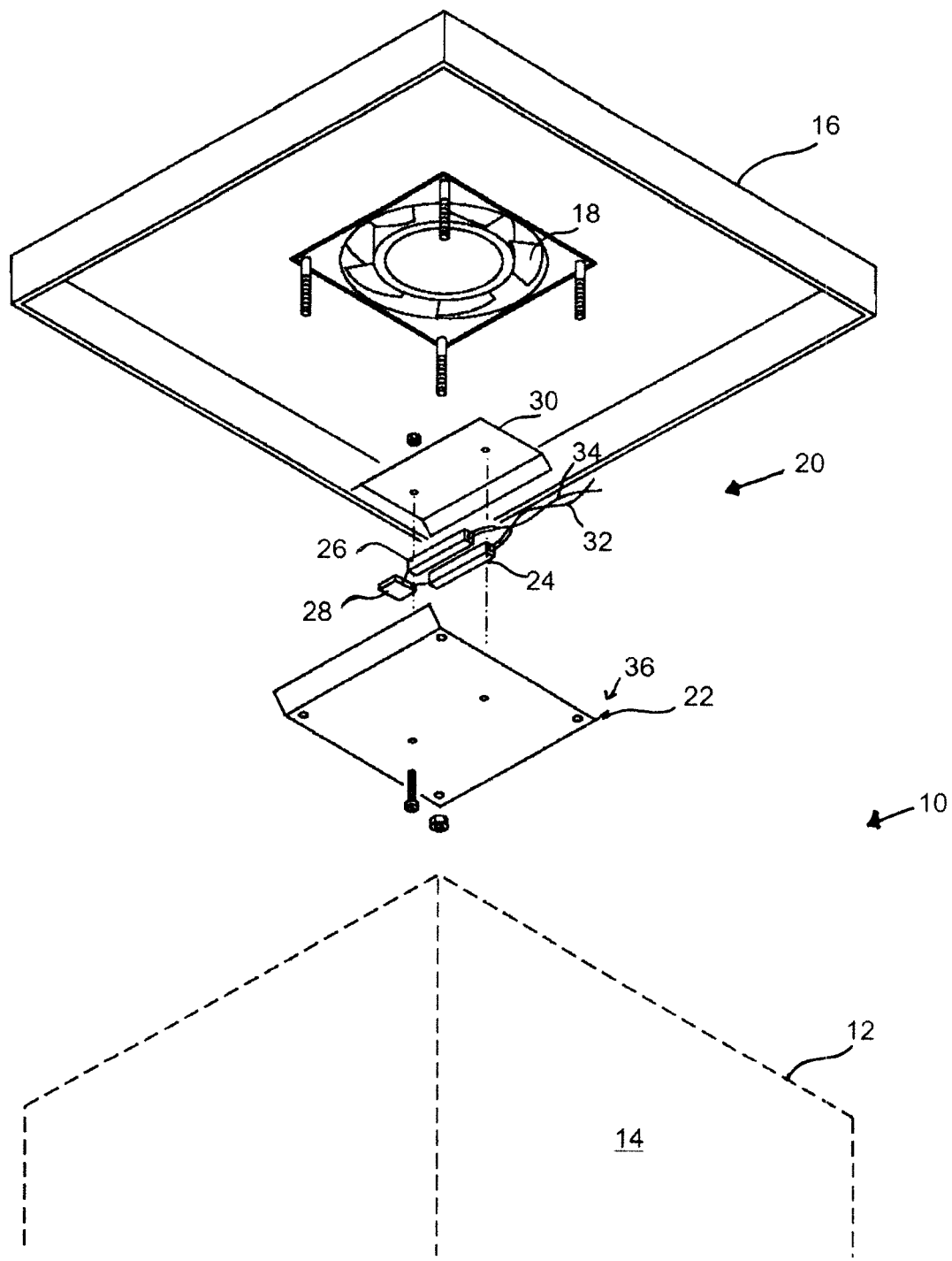
FIG. 1 is a view of a disassembled food dehydrator according to the invention.
Figure 2:
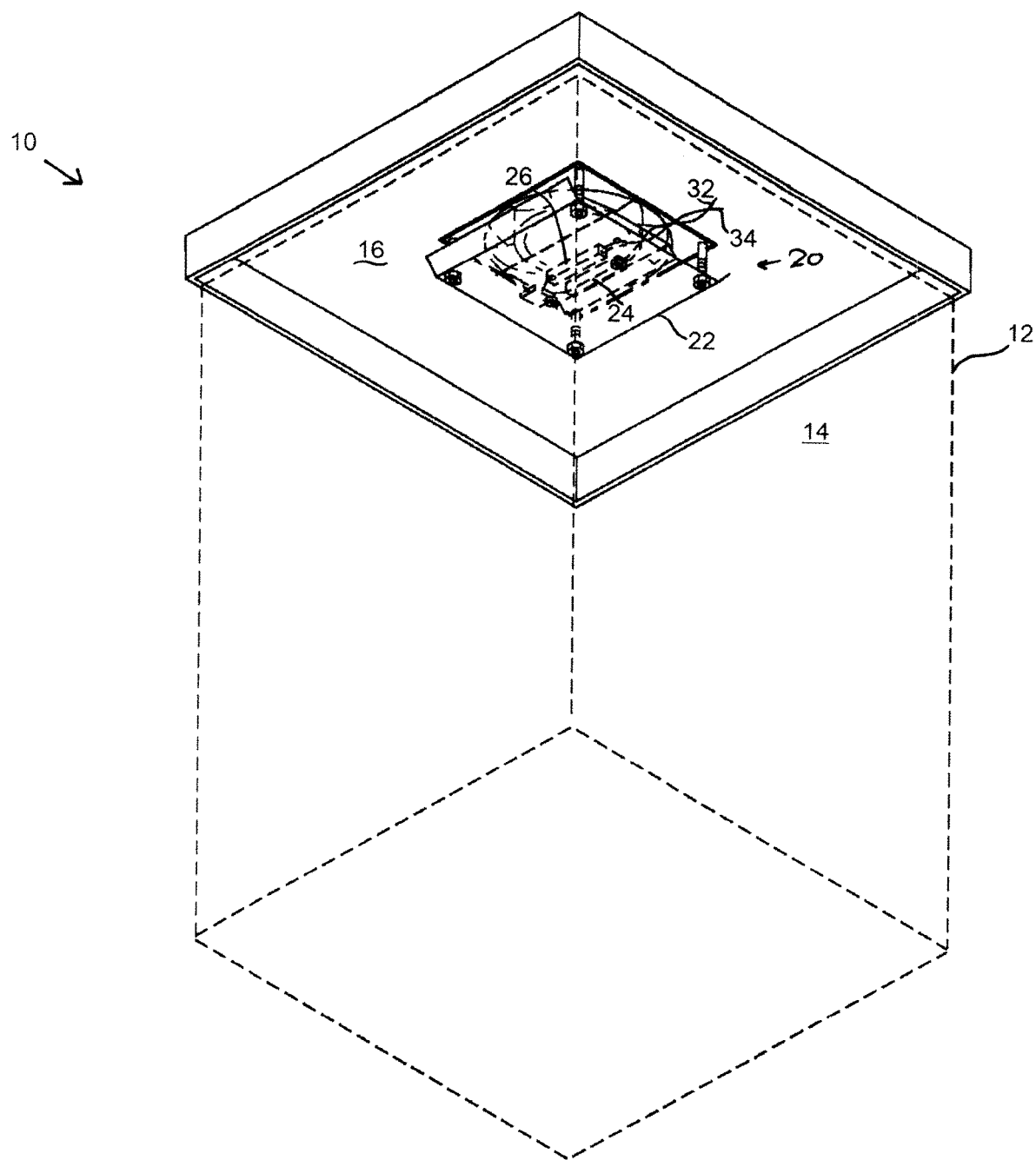
FIG. 2 is a view of the assembled form of the food dehydrator in FIG. 1.
Figure 3:
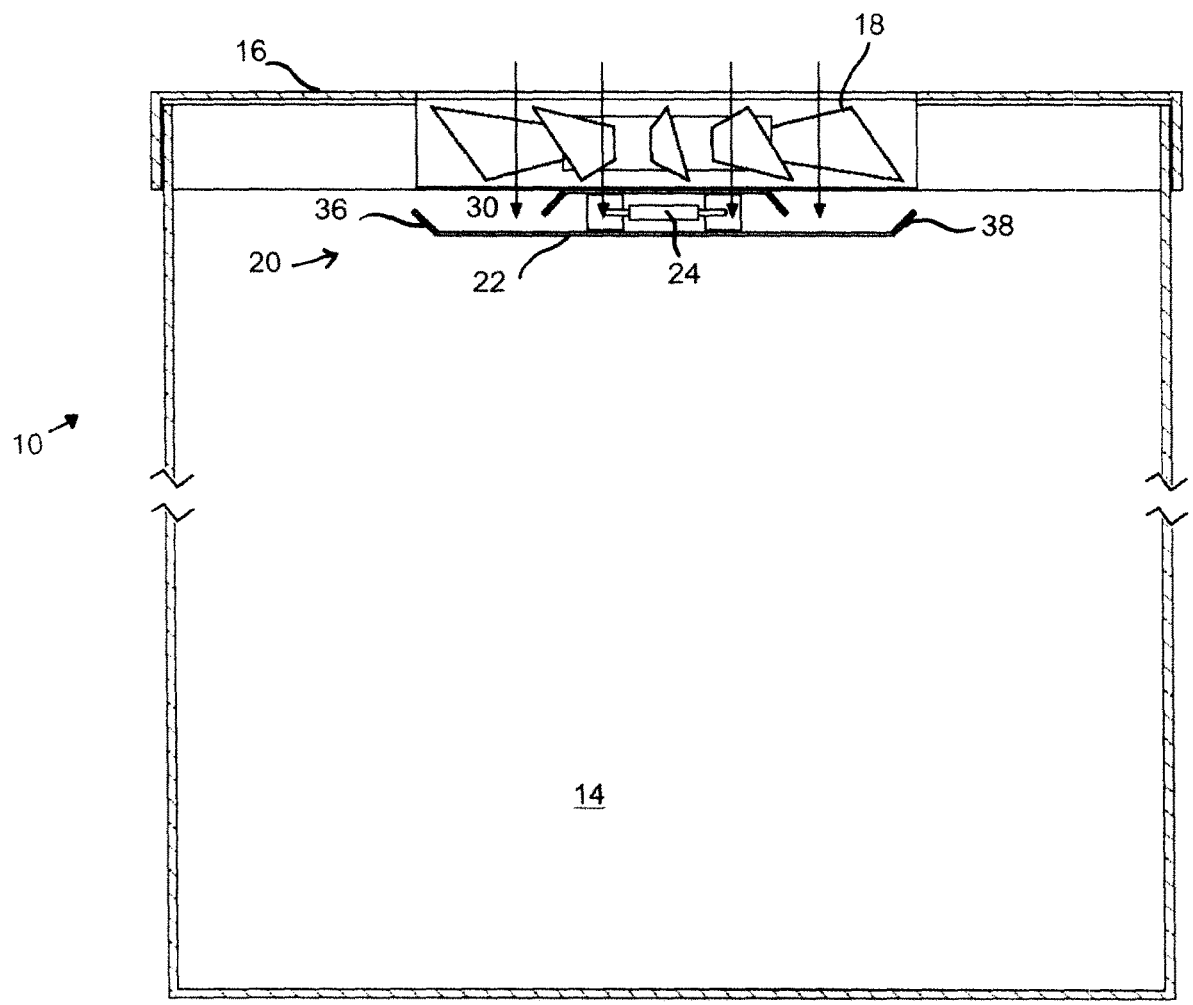
FIG. 3 is a cross-sectional side view of the food dehydrator of FIG. 2.

FIGS. 1 and 2 respectively show in disassembled and assembled forms, a food dehydrator 10, according to the invention, which includes a chamber 12 defining a volume 14 for receiving foodstuff, a lid 16 for sealing the volume and a fan 18 mounted in or to the lid 16. A heating element 20 is mounted on the lid below the fan 18.

The heating element 20 includes a first heatsink 22 which, when assembled, is in contact with a first resistor 24, a second resistor 26 and a thermal cut-out switch 28 connected to one another in series. A second heatsink 30 is placed over the resistors 24 and 26, to create a barrier between the resistors 24 and 26 and to sandwich the resistors 24 and 26 and the switch 28 between the heatsinks 22 and 30.

A first conductive wire 32 and a second conductive wire 34, which supply current to the first and second resistors 24 and 26, respectively, pass through an aperture in the lid 16 to couple with an external power supply source (not shown). Each resistor 24 and 26 is made from ceramic, glass or any other suitable resistive material and is placed in thermal contact with the first heatsink 22 through the use of a thermal paste such as silicone to form a positive heatsink bond. The cut-out switch 28 includes a heat-sensing mechanism (not shown), which is also in good thermal contact with the heatsink 22.

The first heatsink 22 and the second heatsink 30 are each in the form of a respective metal plate made from an aluminium metal.

In use, current is supplied from the external power source and passes through the resistors 24 and 26 causing them to dissipate heat. The heat is transferred to and dispersed in the chamber 12 by means of the first heatsink 22 and second heatsink 30. The fan 18 is configured to blow onto the heatsinks 22 and 30 to assist in dispersing heated air over foodstuff (not shown) which is placed in the chamber, thus causing the foodstuff to dehydrate.

The heatsinks 22 and 30 are each dimensioned to allow optimum heat generation so as to maintain a temperature in the volume 14 at a constant value, preferably at about 28° C. This temperature will however be dependent at least on the atmospheric temperature that prevails.

In a preferred embodiment, a plate used in each heatsink 22 and 30 is about 0.7 mm thick, 130 mm in length and 85 mm in width. Opposing ends 36 and 38 of each plate are folded or curved to form a barrier to the conductive wires 32 and 34.

The conductive wires 32 and 34 are made from a high conductivity metal such as copper. Power supplied to the conductive wires 32 and 34, is about 60 to 70 watts.

The aforementioned dimensions of the plates have specifically been determined to generate an optimum amount of heat using two ceramic resistors supplied with power at between 60 and 70 watts, to maintain a temperature within the volume 14 at a constant 28° C. (when standard ambient conditions prevail). This is an ideal temperature at which meat is dried to make tasty biltong (dried meat) within a short period.

The thermal cut-out switch 28 disrupts current supply to the resistors 24 and 26 when it senses that the first heatsink 22 has reached a predetermined temperature, thereby to allow the heating element 20 to cool.

The heating element 20 is ideally suited for use in a food dehydrator such as a biltong (dried meat) maker. The heating element provides a suitable alternative for incandescent lamps thereby to enable the food drying chamber to be usable in countries in which the use of incandescent lamps has been outlawed.

A power supply box may be mounted on the lid of the chamber in order to supply power to the resistors and to the fan. Preferably the resistors and the fan are connected in parallel so that when the thermal cut-out switch operates, the fan will continue blowing air onto the food in the volume 14 to facilitate drying thereof. Optionally the supply box can be formed with an outlet to allow temporary connection with a suitable power cord.

Alternatively a switch located on the lid or the supply box could be used to manually control the heating elements by switching them on or off. The invention is not limited in this respect.

In one embodiment, a suitable gauge (digital) for measuring the temperature and the moisture content of the chamber is mounted to the lid 16 and serves to display relevant information pertaining to these parameters to a user.

The invention claimed is:

1. A food dehydrator which has a chamber defining a volume for receiving foodstuff, comprising:
   a lid for sealing the volume;
   a heating element mounted to the lid, the heating element comprising a metal plate, acting as a first heatsink, which is in thermal contact with at least one resistor;
   a protective plate, acting as a second heatsink, which is placed over the at least one resistor;
   a power source;
   a fan which is mounted to the lid and which is configured to create an airflow over the resistor and the first heatsink to distribute heated and dried air in the volume; and
   a switch to control a supply of current from the-power source to the resistor.

2. The food dehydrator according to claim 1, wherein the switch is a thermal cut-out switch.

3. The food dehydrator according to claim 1, wherein the resistor is placed in thermal contact with the heatsink by means of a thermal paste to maintain a positive heatsink bond.

4. The food dehydrator according to claim 1, wherein each heatsink is shaped to restrict access to the resistor and associated current carrying wires.

5. The food dehydrator according to claim 1, wherein the first heatsink is made from aluminium.

6. The food dehydrator according to claim 1, wherein the power source includes a power supply box which is mounted to an external part of the chamber.

7. The food dehydrator according to claim 1, wherein the resistor is between the first heatsink and the second heatsink.

8. The food dehydrator according to claim 1, wherein the fan is connected in parallel to the switch.

* * * * *